US009345075B2

(12) United States Patent
Yamamichi et al.

(10) Patent No.: US 9,345,075 B2
(45) Date of Patent: May 17, 2016

(54) VEHICULAR HEADLAMP

(71) Applicant: KOITO MANUFACTURING CO., LTD., Tokyo (JP)

(72) Inventors: Tatsuhiko Yamamichi, Shizuoka (JP); Tomokazu Suzuki, Shizuoka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 0 days.

(21) Appl. No.: 14/295,586

(22) Filed: Jun. 4, 2014

(65) Prior Publication Data

US 2014/0361685 A1 Dec. 11, 2014

(30) Foreign Application Priority Data

Jun. 10, 2013 (JP) ................................ 2013-121719
Jul. 8, 2013 (JP) ................................ 2013-142576

(51) Int. Cl.

*B60Q 1/00* (2006.01)
*H05B 33/08* (2006.01)
*F21S 8/10* (2006.01)

(52) U.S. Cl.

CPC ......... *H05B 33/0803* (2013.01); *F21S 48/1159* (2013.01); *F21S 48/215* (2013.01); *F21S 48/325* (2013.01); *H05B 33/0815* (2013.01)

(58) Field of Classification Search

None
See application file for complete search history.

(56) References Cited

U.S. PATENT DOCUMENTS

| | | | | |
|---|---|---|---|---|
| 2009/0154188 A1* | 6/2009 | Ito | F21S 48/1154 | 362/547 |
| 2010/0253223 A1* | 10/2010 | Inoue | F21S 48/1159 | 315/82 |
| 2011/0163684 A1* | 7/2011 | Li | H05B 33/0815 | 315/254 |

FOREIGN PATENT DOCUMENTS

| | | |
|---|---|---|
| JP | 10-086756 A | 4/1998 |
| JP | 2011-129447 A | 6/2011 |
| JP | 2013054919 | 3/2013 |

OTHER PUBLICATIONS

An Office Action dated Aug. 27, 2015, issued from the Korean Patent Office (KIPO) of Korean Patent Application No. 10-2014-0069294 and an English translation thereof.

* cited by examiner

*Primary Examiner* — Douglas W Owens
*Assistant Examiner* — Dedei K Hammond
(74) *Attorney, Agent, or Firm* — Abelman, Frayne & Schwab

(57) ABSTRACT

An object of the present disclosure is to reduce a failure rate due to a prolonged life span of a cooling fan while maintaining a satisfactory heat dissipating performance. When a signal indicating a first light-up state is input, a control unit sets a current value of an output current to a predetermined value such that a cooling fan is rotated at a predetermined rotation speed, and when a signal indicating a second light-up state is input, the control unit lowers the current value of the output current to a value lower than the predetermined value such that the rotation speed of the cooling fan is lower than the predetermined rotation speed. Therefore, the life span of the cooling fan may be prolonged while maintaining the satisfactory heat dissipating performance.

12 Claims, 5 Drawing Sheets

VEHICULAR HEADLAMP

CROSS-REFERENCE TO RELATED APPLICATIONS

This application is based on and claims priority from Japanese Patent Application Nos. 2013-121719 and 2013-142576, filed on Jun. 10, 2013, and Jul. 8, 2013, respectively, with the Japan Patent Office, the disclosures of which are incorporated herein in their entireties by reference.

TECHNICAL FIELD

The present disclosure relates to a technical field of a vehicular headlamp including a cooling fan and capable of adjusting an amount of luminescence of a light source.

BACKGROUND

Some vehicular headlamps include a cooling fan to dissipate heat. A so-called forced cooling method using a cooling fan has an excellent heat dissipating performance so as to reduce a size of a heat sink, which may contribute to reducing a size of a vehicular headlamp.

Japanese Patent Laid-Open No. 2013-54919 discloses a technology which controls a cooling fan depending on environmental temperature in a vehicular lamp including a cooling fan.

Further, there is a vehicular headlamp including a cooling fan is provided with a power converting unit which obtains an output current to turn on a light source and a control unit which converts a current value of the output current to adjust an amount of luminescence of a light source.

SUMMARY

Here, the vehicular headlamp of the related art continuously rotates the cooling fan when the light source is turned on. However, this may cause a lift span of the cooling fan in the vehicular headlamp which may adjust the amount of luminescence to be shortened. For example, a low beam or a high beam is dimmed by adjusting an output current value by the power converting unit to be considered to be used as daytime running lamp (DRL) light. In this case, the DRL light is required to be continuously turned on during the daytime so that when the cooling fan is continuously rotated while the DRL light is turned on, a life-span of the cooling fan is significantly lowered. For example, when a lighting time of the DRL is estimated assuming that a life span of a vehicular is 15 years, the lighting time is approximately 6,000 hours, which means that this exceeds a general life span of the cooling fan. The ephemeralization of the cooling fan undesirably causes the increase of failure rate of the vehicular headlamp.

Therefore, the present disclosure has been made in an effort to provide a vehicular headlamp configured to change a current value of an output current of a power converting unit to adjust an amount of luminescence of a light source, which may reduce a failure rate by prolonging a life span of the cooling fan while maintaining a satisfactory heat dissipating performance.

A vehicular headlamp of the present disclosure includes a lamp case provided with a lamp housing having a concave portion which is open to the front side and a cover which closes an opening of the lamp housing; a light source provided in the lamp case; a power converting unit connected to the light source and configured to obtain an output current to light up the light source based on an input voltage; a cooling fan configured to suppress a temperature rising in the lamp case; and a control unit configured to control the light source and the cooling fan. When a signal indicating a first light-up state is input, the control unit sets a current value of the output current to a predetermined value such that the cooling fan is rotated at a predetermined rotation speed, and when a signal indicating a second light-up state is input, the control unit lowers the current value of the output current to a value lower than the predetermined value such that the rotation speed of the cooling fan is lower than the predetermined rotation speed. Accordingly, in the second light-up state, the rotation speed of the cooling fan is lowered in accordance with the lowering of a heating value of the light source due to the dimmed light.

In the above-mentioned vehicular headlamp, the control unit performs a temperature derating control for the output current and changes a characteristic of the temperature derating control when the signal indicating the first light-up state is input or when the signal indicating the second light-up state is input. Accordingly, a temperature derating control characteristic is switched corresponding to a case where the rotation speed of the cooling fan is lowered as compared with usual.

In the above-mentioned vehicular headlamp, when the signal indicating the second light-up state is input, the control unit stops the cooling fan. Accordingly, no stress is applied to the cooling fan in the second light-up state.

In the above-mentioned vehicular headlamp, the first light-up state is a light-up state of a low beam or a high beam, the second light-up state is a light-up state of daytime running lamp light, and the light source is a common light source used in the light-up state of the low beam or the high beam and the light-up state of the daytime running lamp light. Accordingly, the DRL may be accomplished by dimming the low beam or the high beam.

The vehicular headlamp of the present disclosure further includes a heat sink to which heat emitted from the light source is transmitted and is blown from the cooling fan. Accordingly, the heat transferred to the heat sink is efficiently dissipated by being blown from the cooling fan.

Therefore, according to the present disclosure, a vehicular headlamp is configured to change a current value of an output current of a power converting unit to adjust an amount of luminescence of a light source to reduce a failure rate by prolonging a life span of the cooling fan while maintaining a satisfactory heat dissipating performance.

The above-described summary is illustration purposes only and does not intend to limit in any ways. In addition to the illustrative embodiment, examples, and features described above, additional embodiment, example, and features will become apparent by referring to the drawings and the following detailed description.

DETAILED DESCRIPTION

Figure 1:
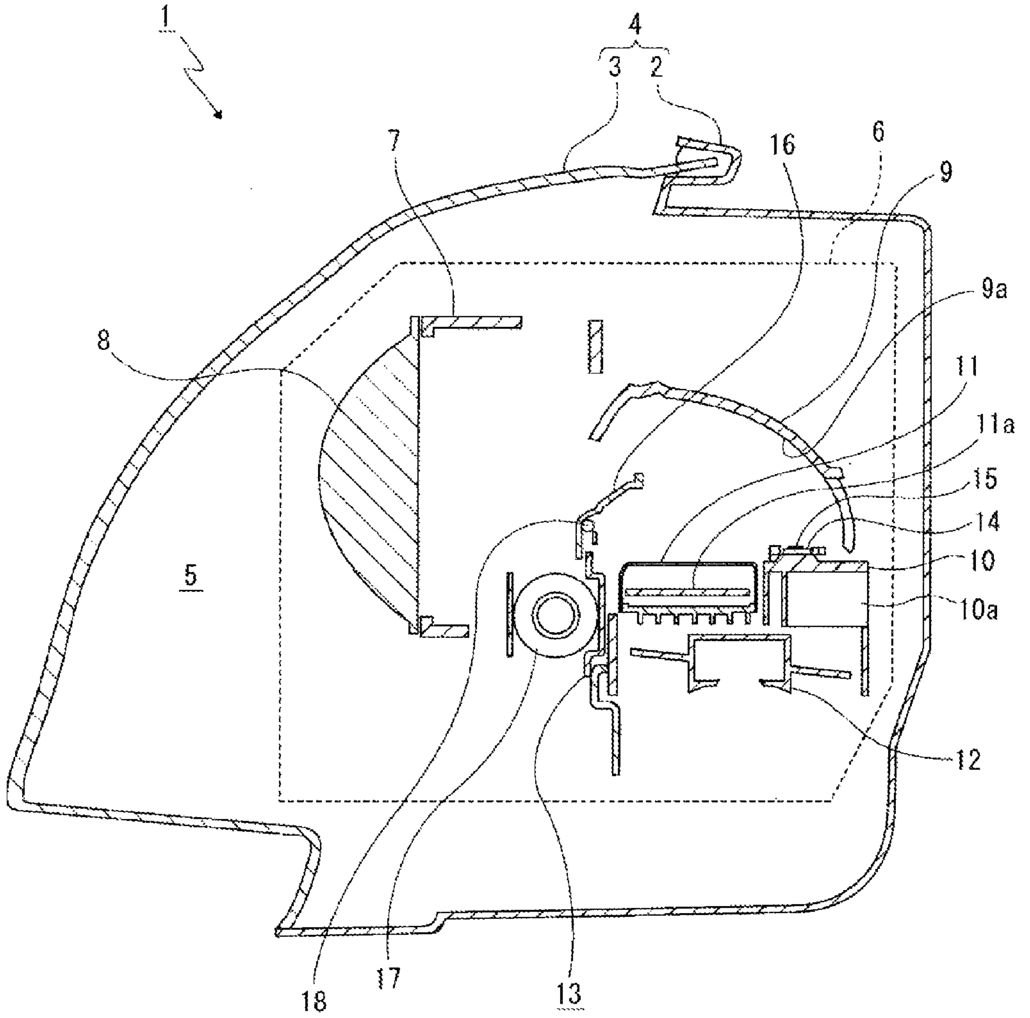
FIG. 1 is a schematic vertical sectional view of a vehicular headlamp.

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Hereinafter, a mode for implementing a vehicular headlamp according to an exemplary embodiment of the present disclosure will be described with reference to accompanying drawings.

Vehicular headlamps 1 are attached at both left and right ends in a front end of a vehicle body. Each of the vehicular headlamp 1 includes a lamp housing 2 having a concave portion which is open to the front side and a cover 3 which closes an opening of the lamp housing 2 (see FIG. 1). A lamp case 4 is configured by the lamp housing 2 and the cover 3 and an internal space of the lamp case 4 is formed by a lamp chamber 5.

A lamp unit 6 is disposed in the lamp chamber 5. The lamp unit 6 includes a lens holder 7, a projector lens 8 which is attached to a front end portion of the lens holder 7, a reflector 9 which reflects light, a light source unit 10 and a control circuit unit 11 which are disposed below the reflector 9, a cooling fan 12 which is disposed below the light source unit 10 and the control circuit unit 11, and a light control mechanism 13 which is disposed between the lens holder 7 and the reflector 9.

The projector lens 8 is formed as a plane-convex lens which has a substantially semi-spherical appearance.

An inner surface of the reflector 9 is formed as a reflective surface 9*a*. The reflector 9 is attached onto a top surface of the light source unit 10.

The light source unit 10 includes a circuit board 14 and a light source 15 which is mounted on a top surface of the circuit board 14. The light source 15 is configured such that a plurality of semiconductor light emitting elements is connected in series to each other. A light emitting diode (LED) is used as the semiconductor light emitting element in the light source 15.

A heat sink 10*a* is formed below the circuit board 14 in the light source unit 10. Heat which is generated from the control circuit unit 11, the circuit board 14, and the light source 15 is transferred to the heat sink 10*a*. Heat is blown from the cooling fan 12 to the heat sink 10*a*.

The control circuit unit 11 is disposed in front of the light source unit 10. A circuit board 11*a* which will be described below is mounted in the control circuit unit 11.

A fan motor 12*a* which will be described below is mounted in the cooling fan 12 and the cooling fan 12 rotates in accordance with the rotation of the fan motor 12*a*. Temperature rising in the lamp case 4 is suppressed as the cooling fan 12 rotates.

The light control mechanism 13 includes a movable shade 16 and a shade driving unit 17. The movable shade 16 may rotate around a rotary shaft 18 as a pivot point between a first state where a part of light emitted from the light source 15 is shielded and a second state where a shielded amount is less than that of the first state. When the movable shade 16 is in the first state, the movable shade 16 is in a low beam distribution state and when the movable shade 16 is in the second state, the movable shade 16 is in a high beam distribution state.

The shade driving unit 17 includes an actuator 17*a* which will be described below and rotates the movable shade 16 between the first state and the second state by transmitting a power using the actuator 17*a*. In the present exemplary embodiment, the movable shade 16 is configured to maintain the first state (low beam distribution state) when the actuator 17*a* is in a non-conductive state. Therefore, the actuator 17*a* is electrically conducted in order to maintain the second state (high beam distribution state).

Figure 2:
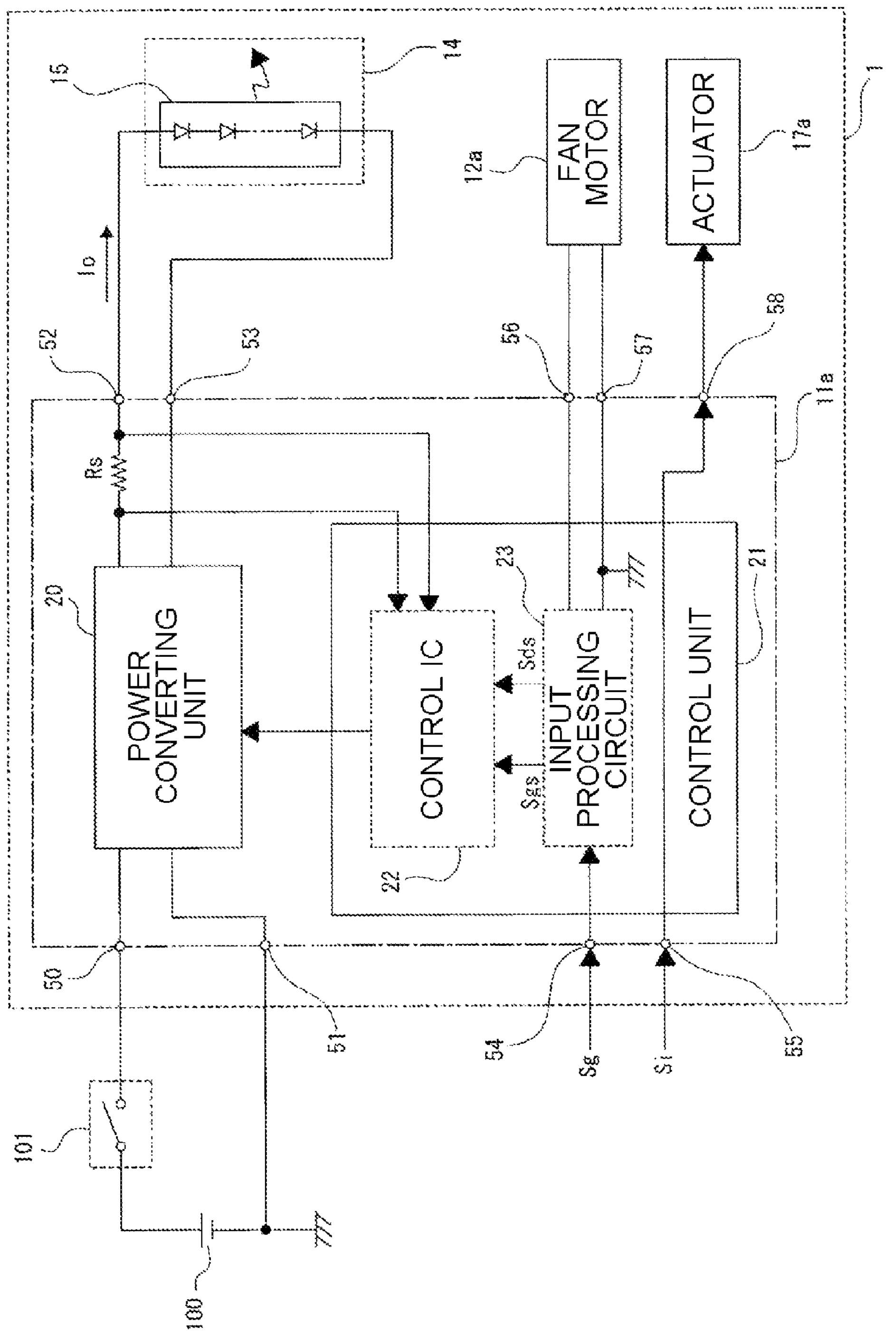
FIG. 2 is a block diagram illustrating a circuit configuration in a vehicular headlamp.

FIG. 2 is a block diagram illustrating a circuit configuration in the vehicular headlamp 1. Further, in FIG. 2, an in-vehicle battery 100 which is provided outside the vehicular headlamp 1 and a lighting switch 101 are also illustrated.

In the vehicular headlamp 1, in addition to the circuit board 11*a*, the circuit board 14, and the light source 15 which are illustrated in FIG. 1, a fan motor 12*a* which is formed in the cooling fan 12 and an actuator 17*a* which is formed in the shade driving unit 17 are provided.

The circuit board 11*a* includes a power converting unit 20, a control unit 21, terminals such as a positive electrode side input terminal 50, a negative electrode side input terminal 51, a positive electrode side output terminal 52, a negative electrode side output terminal 53, a light dimming signal input terminal 54, a light brightening signal input terminal 55, a fan positive electrode side terminal 56, and a fan negative electrode side terminal 57, and a resistor Rs.

The power converting unit 20 is formed by a DC-DC converter, for example, as a switching regulator. A positive electrode side at an input side of the power converting unit 20 is connected to the positive electrode side input terminal 50 and a negative electrode side thereof is connected to the negative electrode side input terminal 51. A positive electrode side at the output side of the power converting unit 20 is connected to the positive electrode side output terminal 52 via the resistor Rs and a negative electrode side thereof is connected to the negative electrode side output terminal 53.

The positive electrode side input terminal 50 is connected to a positive electrode side of the in-vehicle battery 100 via the lighting switch 101 and the negative electrode side input terminal 51 is connected to a negative electrode side (ground GND) of the in-vehicle battery 100. The positive electrode side output terminal 52 and the negative electrode side output terminal 53 are connected to anode terminals and cathode terminals of a plurality of LEDs which configures the light source 15.

The power converting unit 20 boosts or drops a DC voltage which is obtained between the positive electrode side input terminal 50 and the negative electrode side input terminal 51 as the lighting switch 101 is turned on to obtain an output voltage to drive the light source 15 between the positive electrode side output terminal 52 and the negative electrode side output terminal 53 to emit light. An output current Io (emission driving current) from the power converting unit 20 flows to the light source 15 based on the output voltage. Further, the resistor Rs is a resistor to detect a current value of the output current Io.

The control unit 21 includes a control integrated circuit (IC) 22 and an input processing circuit 23 and controls the power converting unit 20 and the fan motor 12*a* based on a current value of the output current Io which is detected based on the light dimming signal Sg which is input through the light dimming signal input terminal 54 from the vehicle and the resistance Rs.

The input processing circuit 23 generates a current value indicating signal Sgs and a derating characteristic indicating signal Sds based on a light dimming signal Sg and outputs the signals to the control IC 22. The input processing circuit 23 is connected to the fan motor 12*a* via the fan positive electrode side terminal 56 and the fan negative electrode side terminal 57 and controls the fan motor 12*a* based on the light dimming signal Sg.

Control of the fan motor 12*a* and an internal configuration of the input processing circuit 23 according to the exemplary embodiment will be described below.

The control IC 22 detects the current value of the output current Io based on a voltage at both ends of the resistor Rs and controls the switching element of the power converting unit 20 as a switching regulator to be turned on/off based on the current value of the detected output current Io, the current value indicating signal Sgs, and the derating characteristic indicating signal Sds. That is, the control IC 22 performs duty control of the on/off control signal of the switching element. Specifically, the control IC 22 controls the switching element to be turned on/off so that the current value of the output current Io is maintained at a target value to implement constant current control (stabilization control) on the output current Io. The control IC 22 changes the target value in the constant current control based on the indication by the current value indicating signal Sgs. Therefore, the amount of luminescence of the light source 15 is adjusted to be an amount of luminescence in accordance with the light dimming signal Sg (so-called light control)

The control IC 22 according to the exemplary embodiment performs so-called temperature derating control. That is, the control IC 22 controls the current value of the output current Io in accordance with the temperature. In the control IC 22, a characteristic of the temperature derating control, that is, correspondence of the temperature and the current value of the output current Io (hereinafter, referred to as "temperature derating characteristic") is determined in advance. The control IC 22 obtains a current value of the output current Io which needs to be set in accordance with a current temperature based on temperature information detected by a temperature detecting unit (not illustrated) which is formed in the control IC 22 and the temperature derating characteristic and sets the obtained current value as a target value of the constant current control to implement the temperature derating control. Temperature information required to perform the temperature derating control may be obtained from a thermistor which is provided outside the control IC 22.

The control IC 22 according to the exemplary embodiment changes the temperature derating characteristic in accordance with the derating characteristic indicating signal Sds which is input from the input processing circuit 23, which will be described below again.

A light brightening signal Si which is input through the light brightening signal input terminal 55 is input to the actuator 17*a* through a light brightening signal output terminal 58 via the control unit 21. The actuator 17*a* is off (a non-conductive state) when the light brightening signal Si is at a low level and is on (a conductive state) when the light brightening signal is at a high level. As described above, when the actuator 17*a* is in the non-conductive state, the movable shade 16 is in the first state so that the low beam distribution state is implemented. In contrast, when the actuator 17*a* is in the conductive state, the movable shade 16 is in the second state so that the high beam distribution state is implemented. As described above, the low beam/high beam may be switched by switching the low/high level of the light brightening signal Si. In other words, the light brightening signal Si serves as a low beam/high beam switching indicating signal.

Here, the vehicular headlamp 1 according to the exemplary embodiment is configured to use a common light source 15 to light up the low beam and the high beam and light up the daytime running lamp (DRL) light.

Three light light-up statuses are indicated by two signals of the light dimming signal Sg and the light brightening signal Si from the vehicle. Specifically, light-up states of three types of light of the low beam/high beam/DRL light are indicated as follows:

Low beam . . . Light dimming signal Sg=OPEN, Light brightening signal Si=Low

High beam . . . Light dimming signal Sg=OPEN, Light brightening signal Si=High

DRL light . . . Light dimming signal Sg=GND, Light brightening signal Si=Low

Figure 3:
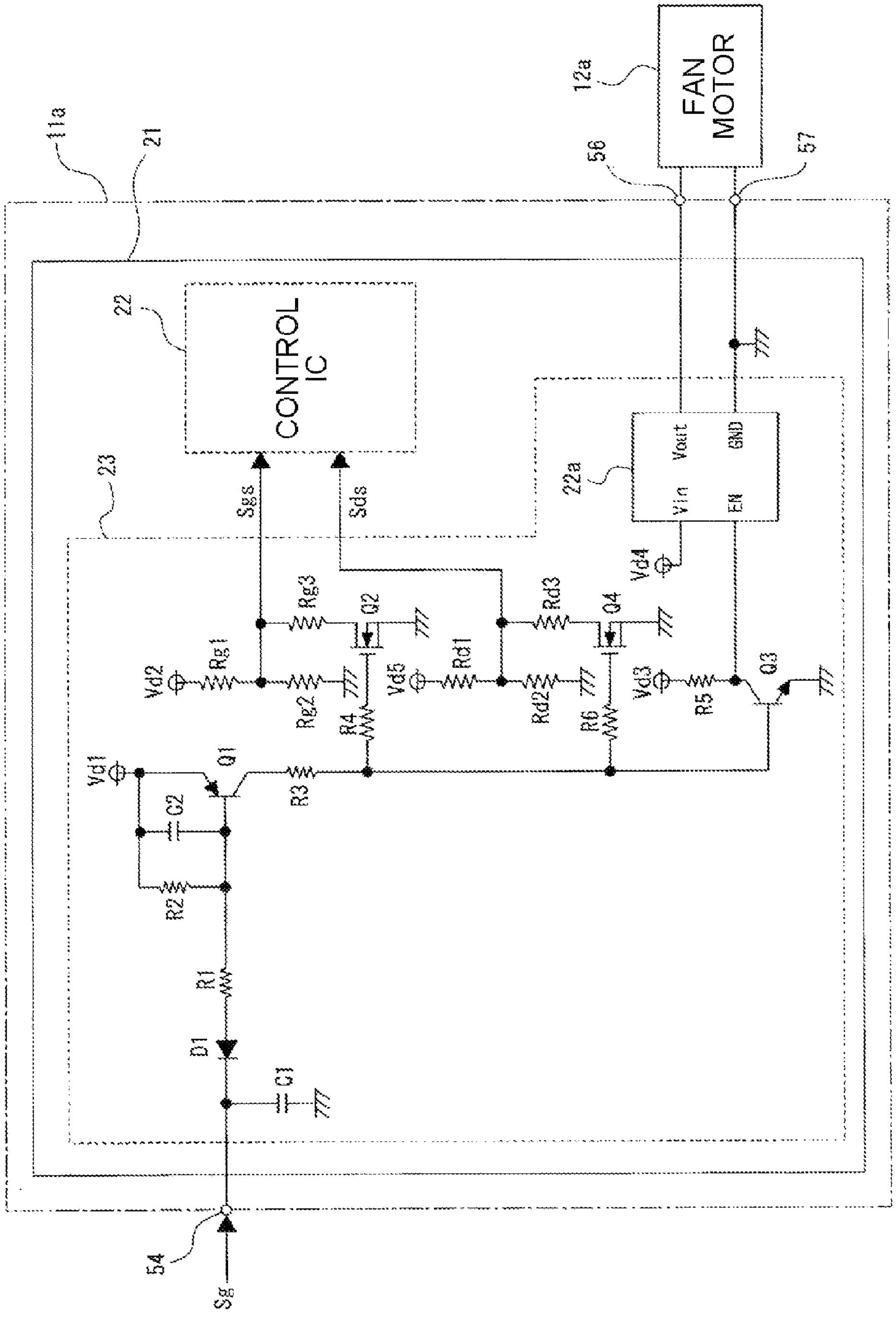
FIG. 3 is a circuit block diagram illustrating an internal configuration of an input processing circuit.

FIG. 3 is a circuit block diagram illustrating an internal configuration of an input processing circuit 23 and illustrates the circuit board 11*a*, the control IC 22, and the fan motor 12*a* in addition to a circuit configuration in the input processing circuit 23.

In the input processing circuit 23, a cathode of the diode D1 is connected to the light dimming signal input terminal 54. A capacitor C1 is inserted between a connection point of the cathode of the diode D1 and the light dimming signal input terminal 54 and the ground.

An anode of the diode D1 is connected to a base of a switching element Q1 which is configured by a PNP type bipolar transistor via the resistor R1. An emitter of the switching element Q1 is connected to a constant voltage source Vd1. Further, a parallel connection circuit of a resistor R2 and a capacitor C2 is inserted between a connection point of the emitter of the switching element Q1 and the constant voltage source Vd1 and the base of the switching element Q1.

The constant voltage source Vd1 generates a DC voltage in accordance with a predetermined level based in a voltage input from the in-vehicle battery 100. This is the same in other constant voltage sources Vd2 to Vd5.

A collector of the switching element Q1 is connected to a gate of a switching element Q2 which is configured by an n channel metal oxide semiconductor field effect transistor (MOSFET) via a resistor R3 and a resistor R4. A source of the switching element Q2 is grounded and a drain thereof is connected to an output line of the current value indicating signal Sgs to the control IC 22 via the resistor Rg3. A connection point of a resistor Rg1 and a resistor Rg2 is connected to a connection point of the output line of the current value indicating signal Sgs and the resistor Rg3. The resistor Rg1 and the resistor Rg2 are inserted in series between the constant voltage source Vd2 and the ground.

A connection point of the resistor R3 and the resistor R4 is connected to the base of the switching element Q3 which is configured by an NPN type bipolar transistor. An emitter of the switching element Q3 is grounded and a collector thereof is connected to the constant voltage source Vd3 via a resistor R5.

A connection point of the collector of the switching element Q3 and the resistor R5 is connected to an enable terminal EN of a fan power IC 22*a*. The fan power IC 22*a* is provided with an input terminal Vin, an output terminal Vout, and a ground terminal GND in addition to the enable terminal and the input terminal is connected to a constant voltage source Vd4, the output terminal is connected to a fan positive electrode side terminal 56, and the ground terminal is connected to a fan negative electrode side terminal 57. When an input signal to the enable terminal is at the high level, the fan power IC 22*a* outputs a driving voltage based on the DC voltage from the constant voltage source Vd4 to the fan motor 12*a* and when the input signal is at the low level, the fan power IC 22*a* stops outputting the driving voltage to the fan motor 12*a*.

A connection point of the resistor R3 and the resistor R4 is connected to a gate of a switching element Q4 which is configured by an n-channel MOSFET via a resistor R6. A source of the switching element Q4 is grounded and a drain thereof is connected to an output line of the derating characteristic indicating signal Sds to the control IC 22 via the resistor Rg3. A connection point of a resistor Rd1 and a resistor Rd2 is connected to a connection point of the output line of the derating characteristic indicating signal Sds and the resistor Rd3. The resistor Rd1 and the resistor Rd2 are inserted in series between a constant voltage source Vd5 and the ground.

Hereinafter, an operation of the control unit 21 which includes the input processing circuit 23 will be described. When a low beam or a high beam light-up state is indicated as indication of a light-up state from the vehicle, the light dimming signal Sg is in an OPEN state. When the light dimming signal Sg is in the OPEN state, the switching element Q1 is turned off and the switching element Q2 is also turned off. When the switching element Q2 is turned off, a level of the current value indicating signal Sgs becomes a level obtained by dividing the DC voltage by the constant voltage source Vd2 by the resistor Rg1 and the resistor Rg2 (hereinafter, referred to as a "first level").

The control IC 22 sets the target value in the constant-current control described above as a predetermined value to control a switching operation of the switching element of the power converting unit 20 so that the current value of the output current Io is maintained to be the predetermined value, as the current value indicating signal Sgs in accordance with the first level is input. As described above, when the light-up state of the low beam or high beam is indicated, it is controlled so that the current value of the output current Io is a predetermined value.

When the light dimming signal Sg is in the OPEN state so that the switching element Q1 is turned off, the switching element Q3 is also turned off. When the switching element Q3 is turned off, a DC voltage based on the constant voltage source Vd3 is input to the enable terminal EN of the fan power IC 22*a* via the resistor R5 and a driving voltage is supplied from the fan power IC 22*a* to the fan motor 12*a*. Accordingly, when the light-up state of the low beam or high beam is indicated, the cooling fan 12 is controlled to rotate at a predetermine rotation speed.

In the meantime, when the light-up state of the DRL light is indicated, a level of the light dimming signal Sg becomes a GND level. When the light dimming signal Sg is in the GND level, the switching element Q1 is turned on and the switching element Q2 is also turned on. When the switching element Q2 is turned on, the level of the current value indicating signal Sgs becomes a level obtained by dividing the DC voltage based on the constant voltage source Vd2 at a voltage division ratio including the resistor Rg3 in addition to the resistor Rg1 and the resistor Rg2 (hereinafter, referred to as a "second level").

When the current value indicating signal Sgs in accordance with the second level is input, the control IC 22 lowers the target value in the constant-current control to control a switching operation of the switching element of the power converting unit 20 so that the current value of the output current Io is constantly maintained to be lower than the predetermined value. That is, when the light-up state of the DRL light is indicated, the current value of the output current Io is controlled to be lower than the predetermined value described above.

As described above, when the light-up state of the DRL light is indicated, the current value of the output current Io is lowered so that the light from the light source 15 is dimmed Here, as described above, when the light-up state of the DRL light is indicated, a level of the light brightening signal Si is a low level so that the light distribution state of the vehicular headlamp 1 is a low beam distribution state. Accordingly, when the light-up state of the DRL light is indicated, a dimmed low beam is lit up. In other words, the dimmed low beam is used as the DRL light in the exemplary embodiment.

Corresponding to the indication of the DRL light, when the level of the light dimming signal Sg is the GND level so that the switching element Q1 is turned on, the switching element Q3 is also turned on. When the switching element Q3 is turned on, the DC voltage based on the constant voltage source Vd3 is not input to the enable terminal EN of the fan power IC 22*a* so that no driving voltage is supplied to the fan motor 12*a*. That is, the cooling fan 12 is controlled to stop rotation.

As described above, when the light-up state of the DRL light is indicated, the dimmed low beam is lit up as the DRL light and the rotation of the cooling fan 12 stops.

Even though an example which stops the cooling fan 12 is described here, the cooling fan 12 may be controlled to rotate at a rotation speed which is lower than the above-described predetermined rotation speed without completely stopping the rotation.

Subsequently, a temperature derating controlling operation will be described. When the light-up state of the low beam or the high beam is indicated, if the light dimming signal Sg is in the OPEN state so that the switching element Q1 is turned off, the switching element Q4 is also turned off. When the switching element Q4 is turned off, a level of the derating characteristic indicating signal Sds becomes a level obtained by dividing the DC voltage by the constant voltage source Vd5 by the resistor Rd1 and the resistor Rd2 (hereinafter, referred to as a "third level").

In the meantime, when the light-up state of the DRL light is indicated, if the level of the light dimming signal Sg is the GND level so that the switching element Q1 is turned on, the switching element Q4 is also turned on. When the switching element Q4 is turned on, a level of the derating characteristic indicating signal Sds becomes a level obtained by dividing the DC voltage by the constant voltage source Vd5 by a voltage division ratio including the resistor Rd3 in addition to the resistors Rd1 and Rd2 (hereinafter, referred to as a "fourth level").

As described above, when the light-up state of the low beam or the high beam is indicated or the light-up state of the DRL light is indicated, the derating characteristic indicating signal Sds in accordance with different levels is input to the control IC 22. The control IC 22 changes the temperature derating characteristic based on the derating characteristic indicating signal Sds.

Figure 4:
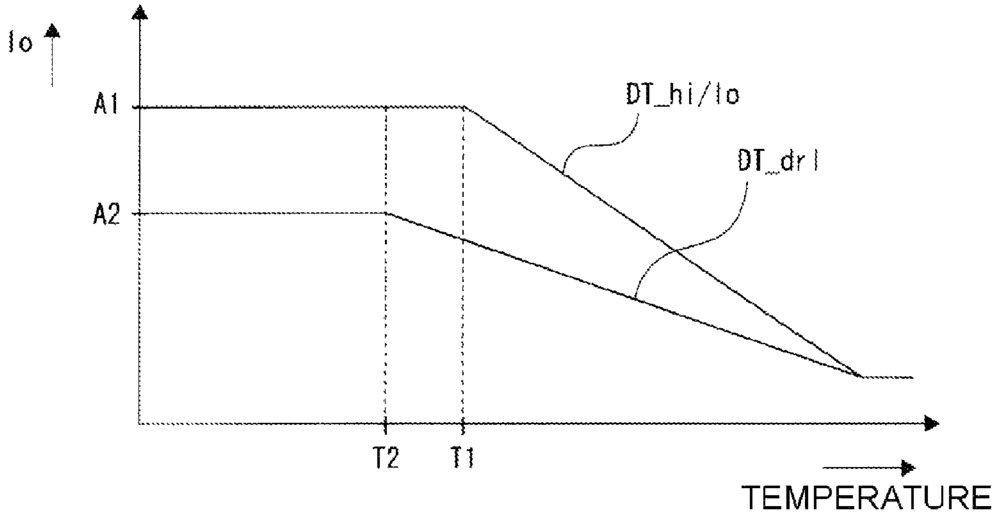
FIG. 4 is an explanatory view of a temperature derating characteristic.

FIG. 4 is an explanatory view of a temperature derating characteristic. When the derating characteristic indicating signal Sds in accordance with the third level is input in response to the indication of the light-up state of the low beam or the high beam, the control IC 22 performs temperature derating control based on the temperature derating characteristic represented by "DT_hi/lo" in the drawing. In the meantime, when the derating characteristic indicating signal Sds in accordance with the fourth level is input in response to the indication of the light-up state of the DRL light, the control IC 22 performs temperature derating control based on the temperature derating characteristic represented by "DT_dr1" in the drawing.

As illustrated in the drawing, according to the temperature derating characteristic DT_hi/lo corresponding to the light-up state of the low beam or the high beam, control is performed such that the current value of the output current Io is maintained to a predetermined value A1 until a predetermined temperature T1 and the current value of the output current Io is gradually lowered in accordance with a temperature rising when a temperature exceeds the temperature T1. In the meantime, according to the temperature derating characteristic DT_dr1 corresponding to the light-up state of the DRL light, control is performed such that the output current Io is maintained to be a current value A2 which is lower than the predetermined value A1 until a temperature T2 which is lower than the temperature T1 and the current value of the output current Io is gradually lowered in accordance with t the temperature rising when the temperature exceeds the temperature T2. In the present exemplary embodiment, the predetermined value A1 is set to, for example, 1.7 A (ampere) and the current value A2 is set to, for example, 0.7 A.

As described above, when the light-up state of the DRL light is indicated by changing the temperature derating characteristic, a derating starting temperature (a temperature at which the current value starts to be lowered) is set to a temperature lower than that of a case when the light-up state of the low beam or the high beam is indicated.

As described above, when the DRL light is lit up, the rotation of the cooling fan 12 stops so that when the DRL light is lit up, the temperature of the light source 15 tends to easily rise. Accordingly, the derating starting temperature is lowered corresponding to the case when the DRL light is lit up, that is, the current value of the output current Io starts to be lowered at a temperature which is lower than a temperature at the time when the low beam or the high beam is lit up so that the temperature rising of the light source 15 is suppressed to optimize the temperature derating control. That is, by doing this, the life span of the light emitting element which configures the light source 15 may be prolonged.

In the present exemplary embodiment, changing of the temperature derating characteristic in accordance with the indication of the light-up state of the DRL light may also mean changing of the temperature derating characteristic as the current value of the output current Io is lowered.

As described above, the vehicular headlamp 1 according to the present exemplary embodiment includes a lamp case 4 which is configured by a lamp housing 2 having a concave portion which is open to the front side and a cover 3 which closes an opening of the lamp housing 2, a light source 15 which is provided in the lamp case 4, a power converting unit 20 which is connected to the light source 15 and obtains an output current Io to light up the light source 15 based on an input voltage, a cooling fan 12 which suppress the temperature rise in the lamp case 4, and a control unit 21 which controls the light source 15 and the cooling fan 12.

When a signal indicating a first light-up state (in the present exemplary embodiment, a light-up state of the low beam or the high beam) is input, the control unit 21 controls to rotate the cooling fan 12 at a predetermined rotation speed with a predetermined value A1 as a current value of the output current Io and when a signal indicating a second light-up state (in the present exemplary embodiment, the light-up state of the DRL light) is input, the control unit 21 controls to reduce the current value of the output current Io to a value lower than the predetermined value A1 to reduce the rotation speed of the cooling fan 12 to a rotation speed lower than the predetermined rotation speed.

Accordingly, in a second light-up state, a rotation speed of the cooling fan 12 is lowered in accordance with the lowering of a heating value of the light source 15 due to the dimmed light. Therefore, the life span of the cooling fan 12 may be prolonged while maintaining the satisfactory heat dissipating performance.

According to the present exemplary embodiment, as described above, in the vehicular headlamp 1 which is configured to adjust the amount of luminescence of the light source 15 by changing the current value of the output current Io of the power converting unit 20, the life span of the cooling fan is prolonged while maintaining the satisfactory heat dissipating performance to reduce a failure rate.

In the present exemplary embodiment, the control unit 21 performs temperature derating control for the output current Io and changes the temperature derating control characteristic in the case when a signal indicating the first light-up state is input or in the case when a signal indicating the second light-up state is input. Accordingly, a temperature derating control characteristic is switched corresponding to a case where a rotation speed of the cooling fan 12 is lowered as compared with usual. Therefore, the temperature derating control corresponding to a case where the temperature tends to easily rise is performed so that the life span of the light emitting element which configures the light source 15 may be prolonged.

In the present exemplary embodiment, the control unit 21 stops the cooling fan 12 when the signal indicating the second light-up state is input. Accordingly, no stress is applied to the cooling fan 12 in the second light-up state. Specifically, as described in the present exemplary embodiment, when the second light-up state is the light-up state of the DRL light, no stress is applied to the cooling fan 12 during the daytime. Therefore, the prolongation of the life span of the cooling fan 12 is further enhanced so that the failure rate may be further lowered.

In the present exemplary embodiment, the first light-up state is the light-up state of the low beam or the high beam and the second light-up state is the light-up state of the DRL light and the light source 15 is a common light source which is used in both the light-up state of the low beam or the high beam and the light-up state of the DRL light. Accordingly, the DRL may be accomplished by dimming the low beam or the high beam. Therefore, there is no need to add an additional light source for the DRL so that a size of the vehicular headlamp 1 may be reduced.

In the present exemplary embodiment, a heat sink **10*a* to which heat emitted from the light source 15 is transferred and blown from the cooling fan 12 is provided. Accordingly, the heat which is transferred to the heat sink 10*a* is efficiently dissipated by being blown from the cooling fan 12**. Therefore, the heat dissipating performance is improved.

The present disclosure is not limited to the above-described specific exemplary embodiments and various modified embodiments may be considered. For example, in the above description, even though it is exemplified that the light sources of the low beam, the high beam, and the DRL light are configured as a common light source 15, the vehicular headlamp according to the exemplary embodiment of the present disclosure may include two or more light sources 15.

Figure 5:
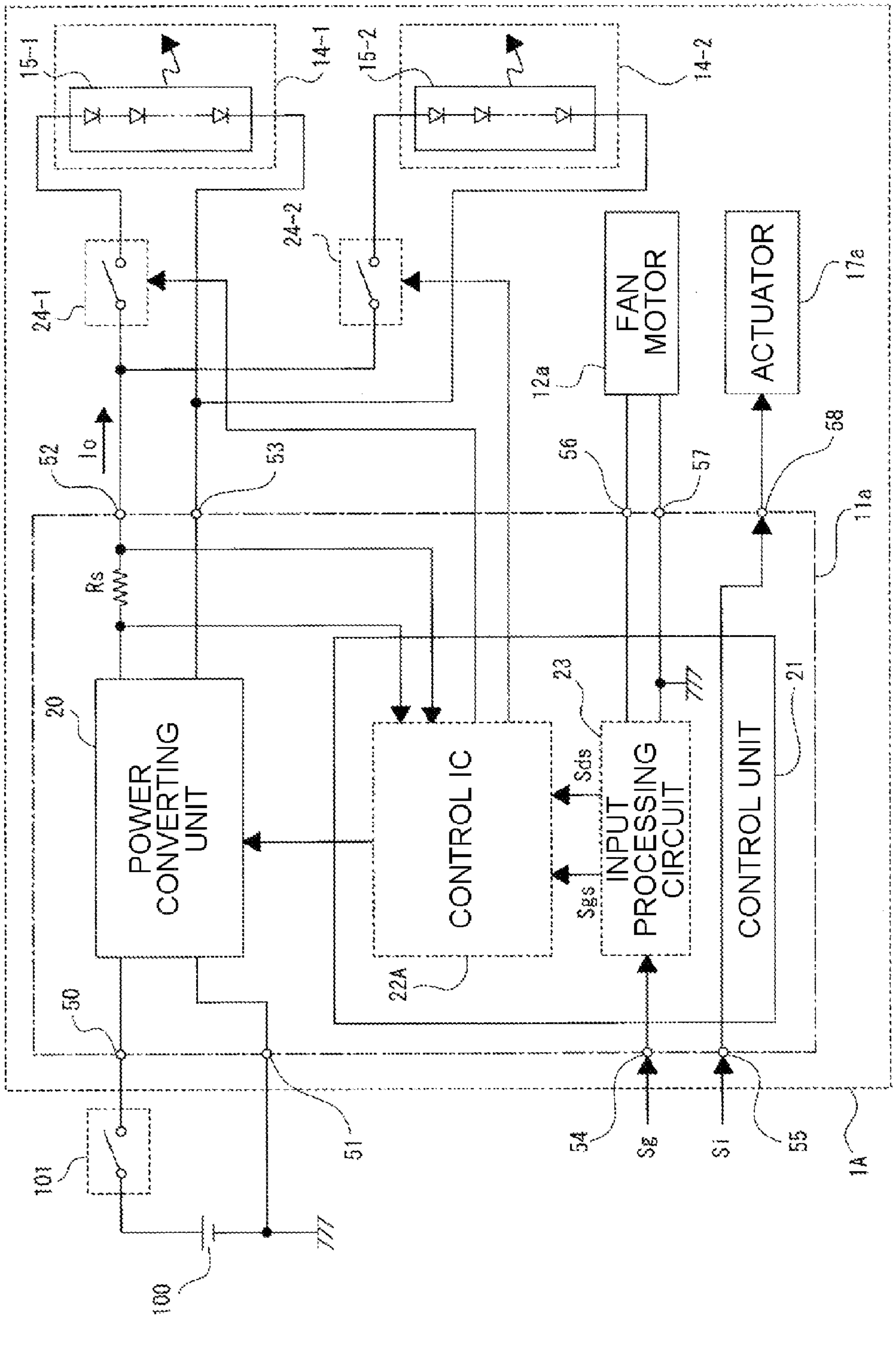
FIG. 5 is a block diagram illustrating a circuit configuration in a vehicular headlamp according to a modified embodiment.

FIG. 5 is a block diagram illustrating a circuit configuration in the vehicular headlamp 1A as a modified embodiment in which two or more light sources 15 are provided. Further, in FIG. 5, like reference numerals designate like elements having the same configuration as those in the above description and description thereof will be omitted.

Difference from the vehicular headlamp 1 described above is that a light source 15-1 and a light source 15-1 are provided as the light source 15, a circuit board 14-1 on which the light source 15-1 is mounted and a circuit board 14-2 on which the light source 15-2 is mounted are provided as the circuit board 14, a switch 24-1 and a switch 24-2 are added, and the control IC 22 is replaced by a control IC 22A.

As illustrated in the drawing, the switch 24-1 is inserted between an anode terminal of an LED which configures the light source 15-1 and a positive electrode side output terminal 52 and the switch 24-2 is inserted between an anode terminal of an LED which configures the light source 15-2 and the positive output terminal 52. A cathode terminal of the LED which configures the light source 15-1 and a cathode terminal of the LED which configures the light source 15-2 are connected to a negative electrode side output terminal 53. The light source 15-1 is a common light source of a low beam and a high beam and the light source 15-2 is a light source for DRL light.

The control IC 22A controls the switch 24-1 and the switch 24-2 to be on/off in addition to the control performed by the control IC 22. Specifically, the control IC 22A turns on the switch 24-1 and turns off the switch 24-2 when the current value indicating signal in accordance with the first level described above is input corresponding to the indication of the light-up state of the low beam or the high beam. Therefore, the light source 15-1 for the low beam and the high beam is turned on and the light source 15-2 for the DRL light is turned off so that the light-up state of the low beam or the high beam is realized.

In the meantime, the control IC 22A turns off the switch 24-1 and turns on the switch 24-2 when the current value indicating signal in accordance with the second level described above is input corresponding to the indication of the light-up state of the DRL light. Therefore, the light source 15-1 for the low beam and the high beam is turned off and the light source 15-2 for the DRL light is turned on so that the light-up state of the DRL light is realized.

In the above description, even though it is illustrated that the dimmed low beam is used as the DRL light, the dimmed high beam may be used as the DRL light. In this case, the indication of the light-up state of the DRL light may be changed to be "Light dimming signal Sg=High and Light brightening signal Si=High".

The low beam is distributed to the lower side so that a driver of an oncoming vehicle may be prevented from being distracted. Therefore, when the dimmed low beam is used as the DRL light, the DRL light which prevents the driver from being distracted may be implemented.

In the above description, even though it is exemplified that the second light-up state which is a light-up state of any one of the first light-up state and the second light-up state which requires to be dimmed (that is, it is required to lower the current value of the output current Io) is the light-up state of the DRL light, the second light-up state may be a light-up state of light other than the DRL light, such as clearance lamp (CLL) light.

In the above description, even though it is exemplified that the light emitting element which configures the light source 15 is an LED, the light source which is provided in the vehicular headlamp of the present disclosure may be configured by other light emitting element such as an organic EL element.

In the above description, even though the vehicular headlamp 1 having the reflector 9 is illustrated, the present disclosure may be applied to a so-called direct vehicular headlamp which does not have a reflector.

The present disclosure may be applied to a vehicular headlamp other than the vehicular headlamp which switches the low beam and the high beam using a movable shade. For example, the present disclosure may be applied to a vehicular headlamp in which a light source for the low beam and a light source for the high beam are separately provided and the light sources are controlled to be turned on and off to switch the low beam/high beam.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A vehicular headlamp, comprising:

a lamp case provided with a lamp housing having a concave portion which is open to the front side and a cover which closes an opening of the lamp housing;

a light source provided in the lamp case;

a power converting unit connected to the light source and configured to obtain an output current to light up the light source based on an input voltage, such that an amount of luminescence of the light source is adjusted by a current value of the output current;

a cooling fan configured to suppress a temperature rising in the lamp case; and a control unit configured to control the light source and the cooling fan, wherein, when a signal indicating a first light-up state is input, the control unit sets the current value of the output current to a predetermined value such that the cooling fan is rotated at a predetermined rotation speed, when a signal indicating a second light-up state is input, the control unit lowers the current value of the output current to a value lower than the predetermined value such that the rotation speed of the cooling fan is lower than the predetermined rotation speed, and the control unit performs a temperature derating control for the output current and changes a characteristic of the temperature derating control when the signal indicating the first light-up state is input or when the signal indicating the second light-up state is input.

2. The vehicular headlamp of claim 1, wherein, when the signal indicating the second light-up state is input, the control unit stops the cooling fan.

3. The vehicular headlamp of claim 2, wherein the first light-up state is a light-up state of a low beam or a high beam, the second light-up state is a light-up state of daytime running lamp light, and the light source is a common light source used in the light-up state of the low beam or the high beam and the light-up state of the daytime running lamp light.

4. The vehicular headlamp of claim 3, further comprising:

a heat sink to which heat emitted from the light source is transmitted and is blown from the cooling fan.

5. The vehicular headlamp of claim 2, further comprising:

a heat sink to which heat emitted from the light source is transmitted and is blown from the cooling fan.

6. The vehicular headlamp of claim 1, wherein the first light-up state is a light-up state of a low beam or a high beam, the second light-up state is a light-up state of daytime running lamp light, and the light source is a common light source used in the light-up state of the low beam or the high beam and the light-up state of the daytime running lamp light.

7. The vehicular headlamp of claim 6, further comprising:

a heat sink to which heat emitted from the light source is transmitted and is blown from the cooling fan.

8. The vehicular headlamp of claim 1, further comprising:

a heat sink to which heat emitted from the light source is transmitted and is blown from the cooling fan.

9. A vehicular headlamp, comprising:

a lamp case provided with a lamp housing having a concave portion which is open to the front side and a cover which closes an opening of the lamp housing;

a light source provided in the lamp case;

a power converting unit connected to the light source and configured to obtain an output current to light up the light source based on an input voltage, such that an amount of luminescence of the light source is adjusted b a current value of the output current;

a cooling fan configured to suppress a temperature rising in the lamp case; and a control unit configured to control the light source and the cooling fan, wherein, when a signal indicating a first light-up state is input, the control unit sets the current value of the output current to a predetermined value such that the cooling fan is rotated at a predetermined rotation speed, when a signal indicating a second light-up state is input, the control unit lowers the current value of the output current to a value lower than the predetermined value such that the rotation speed of the cooling fan is lower than the predetermined rotation speed, the first light-up state is a light-up state of a low beam or a high beam, the second light-up state is a light-up state of daytime running lamp light, and the light source is a common light source used in the light-up state of the low beam or the high beam and the light-up state of the daytime running lamp light.

10. The vehicular headlamp of claim 9, further comprising:

a heat sink to which heat emitted from the light source is transmitted and is blown from the cooling fan.

11. A vehicular headlamp, comprising:

a lamp case provided with a lamp housing having a concave portion which is open to the front side and a cover which closes an opening of the lamp housing;

a light source provided in the lamp case;

a power converting unit connected to the light source and configured to obtain an output current to light up the light source based on an input voltage, such that an amount of luminescence of the light source is adjusted by a current value of the output current;

a cooling fan configured to suppress a temperature rising in the lamp case; and a control unit configured to control the light source and the cooling fan, wherein, when a signal indicating a first light-up state is input, the control unit sets the current value of the output current to a predetermined value such that the cooling fan is rotated at a predetermined rotation speed, when a signal indicating a second light-up state is input, the control unit lowers the current value of the output current to a value lower than the predetermined value such that the rotation speed of the cooling fan is lower than the predetermined rotation speed, when the signal indicating the second light-up state is input, the control unit stops the cooling fan, the first light-up state is a light-up state of a low beam or a high beam, the second light-up state is a light-up state of daytime running lamp light, and the light source is a common light source used in the light-up state of the low beam or the high beam and the light-up state of the daytime running lamp light.

12. The vehicular headlamp of claim 11, further comprising:

a heat sink to which heat emitted from the light source is transmitted and is blown from the cooling fan.

* * * * *